Figure 1:
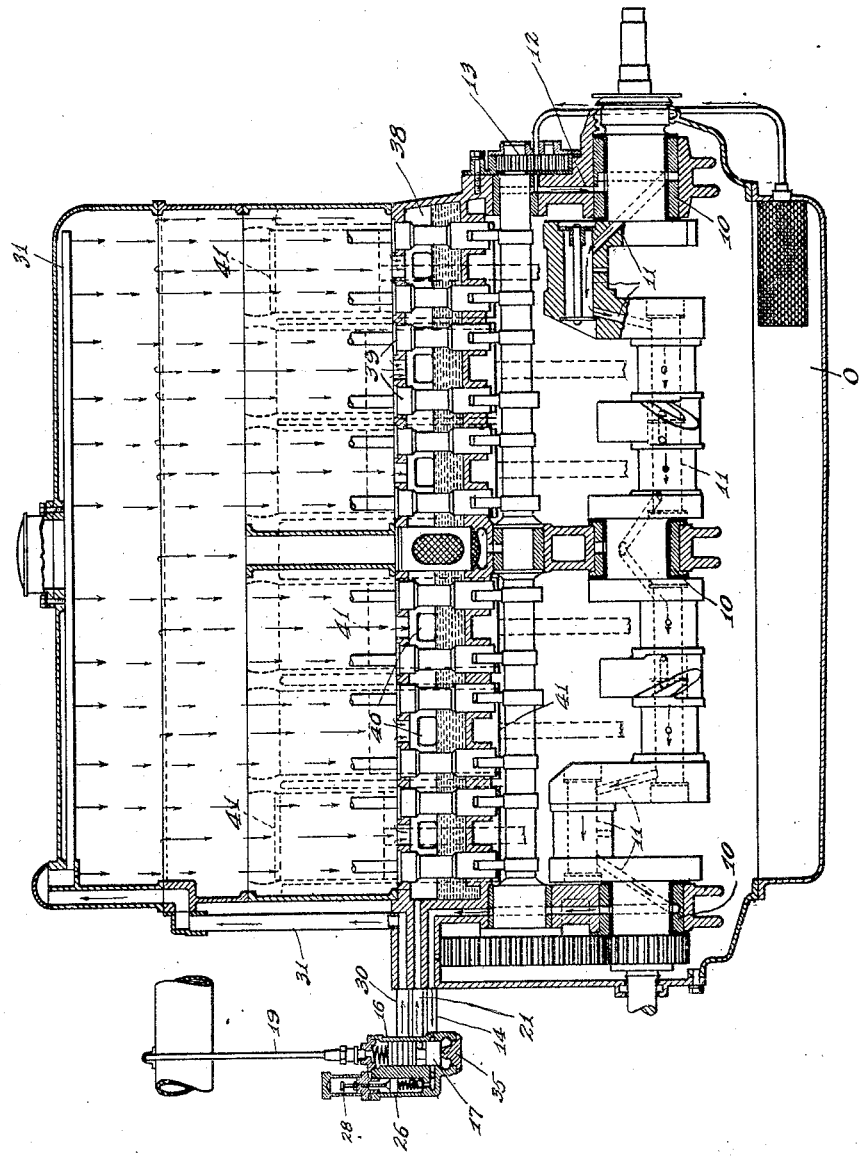

May 5, 1925.  
C. E. JEFFERS  
OILING SYSTEM  
Filed Feb. 2, 1921

1,537,013

2 Sheets-Sheet 1

Inventor  
Clarence E. Jeffers,

By Hood & Schley  
Attorneys

May 5, 1925.
C. E. JEFFERS
OILING SYSTEM
Filed Feb. 2, 1921
1,537,013
2 Sheets-Sheet 2
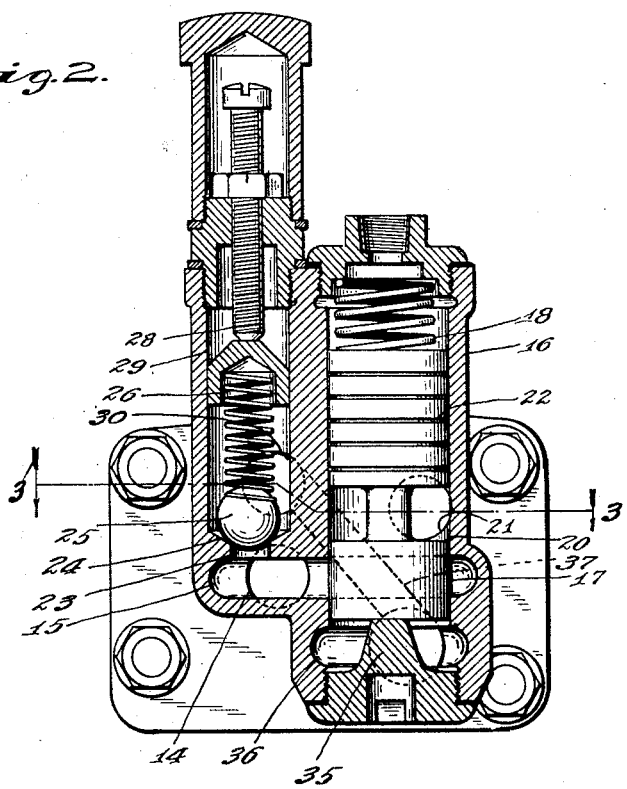
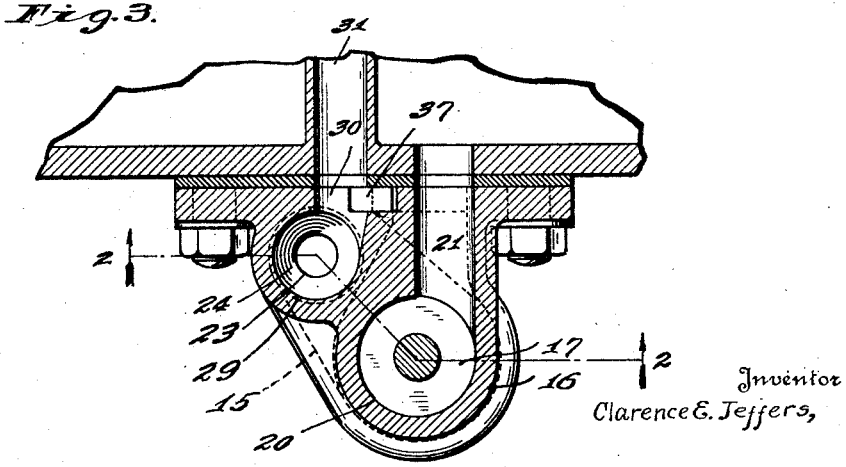
Inventor
Clarence E. Jeffers,
By Hood & Schley
Attorneys Patented May 5, 1925.

1,537,013

UNITED STATES PATENT OFFICE.

CLARENCE E. JEFFERS, OF INDIANAPOLIS, INDIANA, ASSIGNOR TO HOWARD C. MARMON, OF INDIANAPOLIS, INDIANA.

OILING SYSTEM.

Application filed February 2, 1921. Serial No. 441,907.

*To all whom it may concern:*

Be it known that I, CLARENCE E. JEFFERS, a citizen of the United States, residing at Indianapolis, in the county of Marion and State of Indiana, have invented a new and useful Oiling System, of which the following is a specification.

In the operation of automobiles there are many bearing surfaces, particularly those of the crank-shaft, pitmen, and pistons and cooperating cylinder surfaces, which prove more efficient when supplied with oil in amounts varying with the variations of load, while other bearings may most conveniently be supplied with a superabundance of oil without detriment, either to the oil or the mechanism.

The object of my present invention is to provide a construction and arrangement by means of which a force-feed lubrication may be maintained wherein the quantity of oil flowing to and beyond the primary bearings will be uniform at any given speed operation, but the delivery pressure will be dependent upon the load conditions of the engine.

The accompanying drawings illustrate my invention. Fig. 1 is a distorted vertical section of my device and associated parts; Fig. 2 a vertical section of the controlling valve on line 2—2 of Fig. 3; Fig. 3 a horizontal section on line 3—3 of Fig. 2.

In the drawings, 10 indicates a series of primary bearings, such, for instance, as the crank-shaft bearings and closely associated parts, of an internal combustion engine, which bearings are to be positively served with a proper quantity of oil, depending upon load conditions. In the present instance, these bearings 10 are served from a tortuous passage 11 leading through the crank shaft and connected, at its receiving end, with the discharge pipe 12 of a positive pressure oil pump 13 conveniently of the usual gear type and delivering its entire output, under all conditions, to passage 11.

The oil discharged from the outer end of passage 11 passes into a pipe 14 which leads into a chamber 15 which surrounds, and communicates with, an intermediate portion of, the valve cylinder 16. Fitted within the valve cylinder is a piston valve 17, the lower end of which normally blocks chamber 15. Valve 17 is normally held in its lowest position both by its weight and by a spring 18, the strength of which is carefully determined in the factory. Leading from the upper end of the valve cylinder 16 is a pipe 19, which connects with the inlet manifold, as indicated in Fig. 1.

The valve 17 is reduced at an intermediate point and above the portion blocking lower end, to form a leakage chamber 20, so that any oil which leaks by from chamber 15 may flow back to the oil sump O, through a passage 21 and thus be prevented from being sucked up into the manifold, past valve 17.

As a further guard against any oil being sucked up into the manifold, I make the valve 17 of considerable length above chamber 20 and provide shallow circumferential grooves 22.

Leading from chamber 15 is a passage 23 which terminates in an outwardly directed seat 24, on which is seated a pressure-determined valve 25, yieldingly held to its seat by a spring 26 having an adjustable abutment 28. Valve 25, and its spring, is mounted in a chamber 29, from which leads a passage 30, which may be connected directly with the oil sump O, or may, as in the present instance, be connected to a pipe 31 which leads to various bearings which may be properly supplied at all times with an excess of oil, such, for instance, as timing gears, valve rods and levers, etc., the surplus gravitating, in due course, to the oil sump.

The downward, or closing movement, of valve 17 is limited by a stop 35, so as to leave a chamber 36 in the lower end of the valve cylinder 16, and a by-pass 37 forms a connection between this chamber 36 and the chamber 29. This by-pass 37 might, of course, lead directly back to the oil sump, but in practice, I prefer to deliver the oil flowing therethrough to the pipe 31 and the bearings supplied thereby. Whenever the vacuum in the inlet manifold is sufficient, valve 17 will be raised so as to permit the oil to flow through chamber 36 and by-pass 37. As a consequence, under light load conditions, oil will be delivered to bearings 10 under a very light pressure, due primarily to the gravity-head in pipe 31, but under heavier load conditions, the pressure of oil in passage 11 will be determined by spring 26.

It will be noted that, with the above described construction, the full discharge of the pump traverses the passage 11 (which supplies the primary bearings) at all times and there can be no failure of delivery of oil to any of bearings 10; the maximum delivery pressure to the primary bearings 10 is controlled by the valve 25; the opening of communication between chamber 15 and by-pass 37 promptly causes a reduction in pressure in passage 11 but does not decrease the volume of flow through said passage, the consequent reduction in delivery of oil to the bearings 11 being due to the pressure reduction; the by-passing of oil through passage 37 to pipe 31 insures a full supply of oil to the secondary bearings under all conditions. Oil from the upper bearings drops to a chamber 38 so as to supply an abundance of oil to the valve stems 39 and through openings 40 oil passes to the pistons 41.

I claim as my invention:

1. The combination with an internal combustion engine having bearings requiring oil varying in amount with load conditions, an oil conduit leading to such bearings and delivering the oil thereto in seriatim, secondary bearings requiring oil and a conduit leading thereto, an oil pump having a source of supply and a discharge conduit leading to said first-mentioned bearing, means serially beyond the said first-mentioned bearings and in advance of the secondary bearings for maintaining a predetermined pressure in the conduit leading to said first-mentioned bearings, a by-pass valve associated with the oil conduit serially beyond said first-mentioned bearings and arranged, when opened, to relieve the pressure in the conduit leading to said first-mentioned bearings, and means, subject to varying vacuum conditions in the engine, for controlling the position of the by-pass valve.

2. The combination with an internal combustion engine having bearings requiring oil varying in amount with load conditions, an oil conduit leading to such bearings and delivering the oil thereto in seriatim, an oil pump having a source of supply and a discharge conduit leading to said bearings, means serially beyond the said bearings for maintaining a predetermined pressure in the conduit leading to said bearings, a by-pass valve associated with the oil conduit serially beyond said bearings and arranged, when opened, to relieve the pressure in the conduit leading to said bearings, and means, subject to varying vacuum conditions in the engine, for controlling the position of the by-pass valve.

3. The combination with an internal combustion engine having bearings requiring oil varying in amount with load conditions, an oil conduit leading to such bearings and delivering the oil thereto in seriatim, secondary bearings requiring oil and a conduit leading thereto, an oil pump having a source of supply and a discharge conduit leading to said first-mentioned bearing, a valve arranged serially beyond said first-mentioned bearings normally blocking flow through the conduit leading to said first-mentioned bearings, the relation between said valve and conduit being such that pressure within the conduit is ineffective against said valve in the opening direction, and means subject to varying vacuum conditions in the engine for controlling the position of said valve.

4. The combination with an internal combustion engine having bearings requiring oil varying in amount with load conditions, an oil conduit leading to such bearings and delivering the oil thereto in seriatim, an oil pump having a source of supply, and a discharge conduit leading to said bearings, a valve arranged serially beyond said bearings normally blocking flow through the conduit leading to said bearings, the relation between said valve and conduit being such that pressure within the conduit is ineffective against said valve in the opening direction, and means subject to varying vacuum conditions in the engine for controlling the position of said valve.

5. The combination with an internal combustion engine having bearings requiring oil varying in amount with load conditions, an oil conduit leading to such bearings and delivering the oil thereto in seriatim, an oil pump having a source of supply and a discharge conduit leading to said bearings, means serially beyond the said bearings for maintaining a predetermined pressure in the conduit leading to said bearings, a by-pass valve associated with the oil conduit serially beyond said bearings and arranged, when opened, to relieve the pressure in the conduit leading to said bearings, and means for controlling the position of the by-pass valve.

6. The combination with an internal combustion engine having bearings requiring oil varying in amount with load conditions, an oil conduit leading to such bearings and delivering the oil thereto in seriatim, secondary bearings requiring oil and a conduit leading thereto, an oil pump having a source of supply and a discharge conduit leading to said first-mentioned bearing, a valve arranged serially beyond said first-mentioned bearings normally blocking flow through the conduit leading to said first-mentioned bearings, the relation between said valve and conduit being such that pressure within the conduit is ineffective against said valve in the opening direction, and means for controlling the position of said valve.

7. The combination with an internal combustion engine having bearings requiring oil varying in amount with load conditions, an oil conduit leading to such bearings and delivering the oil thereto in seriatim, an oil pump having a source of supply, and a discharge conduit leading to said bearings, a valve arranged serially beyond said bearings normally blocking flow through the conduit leading to said bearings, the relation between said valve and conduit being such that pressure within the conduit is ineffective against said valve in the opening direction, and means for controlling the position of said valve.

8. The combination with an internal combustion engine having bearings requiring oil carrying in amount with load conditions, an oil conduit leading to such bearings and delivering the oil thereto in seriatim, secondary bearings requiring oil and a conduit leading thereto supplied with oil from said first conduit, a pump having a source of oil supply and a discharge conduit leading to said first-mentioned bearings, means beyond the first-mentioned bearings and in advance of the secondary bearings for maintaining a predetermined pressure in the conduit leading to the first-mentioned bearings without affecting the volume of oil passing to said secondary bearings, a by-pass valve associated with the oil conduit beyond said first-mentioned bearings and arranged when opened to relieve the pressure in the conduit leading to the first-mentioned bearings without affecting the volume of oil supply to the secondary bearings, and means for controlling said valve in accordance with the load imposed on the engine.

9. The combination with an internal combustion engine having bearings requiring oil varying in amount with load conditions, an oil conduit leading to said bearings and delivering the oil thereto in seriatim, secondary bearings requiring oil and a conduit leading thereto supplied with oil from said first conduit, a pump having a source of supply and a discharge conduit leading to said first-mentioned bearings, means beyond the first-mentioned bearings and in advance of the secondary bearings for maintaining a predetermined pressure in the conduit leading to the first-mentioned bearings without affecting the volume of oil passing to said secondary bearings, a by-pass valve associated with the oil conduit beyond said first-mentioned bearings and arranged when opened to relieve the pressure in the conduit leading to the first-mentioned bearings without affecting the volume of oil supplied to the secondary bearings, and automatically operated means for controlling said valve in accordance with the load imposed on said engine.

10. The combination with an internal combustion engine having bearings requiring oil varying in amount with load conditions, an oil conduit leading to said bearings, secondary bearings requiring oil and a conduit leading thereto supplied with oil from said first conduit, a pump having a source of oil supply and a discharge conduit leading to said first-mentioned bearings, means beyond the first-mentioned bearings and in advance of the secondary bearings for maintaining a predetermined pressure in the conduit leading to the first-mentioned bearings without affecting the volume of oil passing to said secondary bearings, a by-pass valve associated with the oil conduit beyond said first-mentioned bearings and arranged when opened to relieve the pressure in the conduit leading to said first-mentioned bearings without affecting the volume supplied to the secondary bearings, and means subject to varying vacuum conditions in the engine for controlling the position of said by-pass valve.

11. The combination with an internal combustion engine having bearings requiring oil varying in amount with load conditions, secondary bearings requiring oil, oil conduits leading to both of said sets of bearings and arranged in series, the conduit for said first mentioned bearings delivering the oil thereto in seriatim, an oil pump having a source of supply and a discharge conduit leading to said first mentioned bearings, means in said oil conduits beyond the first-mentioned bearings and in advance of the secondary bearings for maintaining a predetermined pressure in the conduit leading to said first-mentioned bearings without affecting the volume of oil passing to the conduit for said secondary bearings, a by-pass valve associated with the oil conduit beyond said first-mentioned bearings and arranged when opened to relieve the pressure in said conduit without affecting the volume of oil passing into the conduits leading to the secondary bearings, and means subject to the varying vacuum conditions in the engine for controlling the position of the by-pass valve.

12. The combination with an internal combustion engine having bearings requiring oil varying in amount with load conditions, secondary bearings requiring oil, oil conduits leading to both sets of bearings and arranged in series, an oil pump having a source of supply and a discharge conduit leading to said first-mentioned bearings, a by-pass valve associated with said oil conduits beyond said first-mentioned bearings and in advance of said secondary bearings to relieve the pressure in the conduit leading to said first-mentioned bearings without affecting the volume of oil to said secondary bearings, and means subject to varying vacuum conditions in the engine for controlling the position of the by-pass valve.

13. The combination with an internal combustion engine having bearings requiring oil varying in amount with load conditions, an oil conduit leading to such bearings and delivering the oil thereto in seriatim, secondary bearings requiring oil and a conduit leading thereto, an oil pump having a source of supply and a discharge conduit leading to said first-mentioned bearings, a valve beyond the said first-mentioned bearings and in advance of the secondary bearings for maintaining a predetermined pressure in the conduit leading to said first-mentioned bearings, a by-pass valve associated with the oil conduit beyond said first-mentioned bearings and arranged when opened to relieve the pressure in the conduit leading to said first-mentioned bearings, and means subject to varying vacuum conditions in the engine for controlling the position of the by-pass valve.

14. The combination with an internal combustion engine having bearings requiring oil varying in amount with load conditions, an oil conduit leading to such bearings and delivering the oil thereto in seriatim, secondary bearings requiring oil and a conduit leading thereto, an oil pump having a source of supply and a discharge conduit leading to said first-mentioned bearings, a valve opened by oil pressure beyond the first-mentioned bearings and in advance of the secondary bearings for maintaining a predetermined pressure in the conduit leading to said first-mentioned bearings and connecting the conduit leading to said secondary bearings therewith, a by-pass valve unaffected by oil pressure connecting said conduits, and means subject to varying vacuum conditions in the engine for controlling the position of said by-pass valve.

15. The combination with an internal combustion engine having bearings requiring oil varying in amount with load conditions, an oil conduit leading to such bearings and delivering the oil thereto in seriatim, an oil pump having a source of supply and a discharge conduit leading to said bearings, a valve arranged serially beyond said bearings normally blocking flow through the conduit leading to said bearings, and means subject to varying vacuum conditions in the engine for controlling the position of said valve.

16. The combination with an internal combustion engine having bearings requiring oil varying in amount with load conditions, an oil conduit leading to such bearings, secondary bearings requiring oil and a conduit leading thereto, an oil pump having a source of supply and a discharge conduit leading to said first mentioned bearings, a valve arranged serially beyond said first mentioned bearings normally blocking flow through the conduit leading to said first mentioned bearings and means subject to varying vacuum conditions in the engine for controlling the position of said valve.

17. The combination with an internal combustion engine having bearings requiring oil varying in amount with load conditions, of an oil pump having a source of supply, a conduit leading from the discharge of said pump to said bearings and discharging back to the source of supply, an outlet passage leading from said conduit serially beyond said bearings, a valve normally blocking said outlet and means subject to varying vacuum conditions in the engine for controlling the position of said valve.

18. The combination with an internal combustion engine having bearings requiring oil varying in amount with load conditions, of an oil pump having a source of supply, a conduit leading from the discharge of said pump to said bearings and discharging back to the source of supply of the pump, an outlet passage leading from said conduit serially beyond some of said bearings and in front of others, a connection between said outlet to said other bearings, a valve normally blocking said outlet and means subject to varying vacuum conditions in the engine for controlling the position of said valve.

19. The combination with an internal combustion engine having bearings requiring oil varying in amount with load conditions, an oil conduit arranged to deliver oil to said bearings and delivering the oil thereto in seriatim, an oil pump having a source of supply and a discharge conduit leading to said conduit, means serially beyond the said bearings for maintaining a predetermined pressure in the conduit leading to said bearings, a bypass valve associated with the oil conduit serially beyond said bearings and arranged, when opened, to relieve the pressure in the conduit leading to said bearings and means for controlling the position of the bypass valve.

20. The combination with an internal combustion engine having a crank shaft provided with an oil conduit extending therethrough and arranged to feed oil in seriatim to the various bearings of said crank shaft, of an oil pump having a source of supply and a discharge conduit leading to said crank shaft conduit, a valve arranged serially beyond said crank shaft conduit and normally blocking the flow through the conduit leading to said bearings and means subject to varying vacuum conditions in the engine for controlling the position of said valve.

21. The combination with an internal combustion engine having a crank shaft provided with a conduit extending therethrough and arranged to deliver oil in seriatim to the bearings thereof, an oil pump having a source of supply and a discharge conduit leading to said crank shaft conduit, a valve in said crank shaft conduit beyond the bearings thereof having means normally tending to urge said valve closed, a bypass around said valve, a valve controlling said bypass and means subject to varying vacuum conditions in the engine for controlling the position of said second mentioned valve.

22. The combination with an internal combustion engine having a crank shaft provided with an oil conduit extending therethrough and arranged to feed oil in seriatim to the various bearings of said crank shaft, of an oil pump having a source of supply and a discharge conduit leading to said crank shaft conduit, means serially beyond the bearings of said crank shaft for maintaining a predetermined pressure in the crank shaft conduit, a bypass valve associated with the crank shaft conduit serially beyond the crank shaft bearings and arranged when opened to relieve the pressure in the conduit leading to said bearings and means subject to varying vacuum conditions in the engine for controlling the position of the bypass valve.

In witness whereof, I have hereunto set my hand at Indianapolis, Indiana, this twenty-ninth day of January, A. D. one thousand nine hundred and twenty-one.

CLARENCE E. JEFFERS.